July 31, 1934.   H. W. WEBB   1,968,666
SWINGING GATE VALVE
Filed July 30, 1932   2 Sheets-Sheet 2
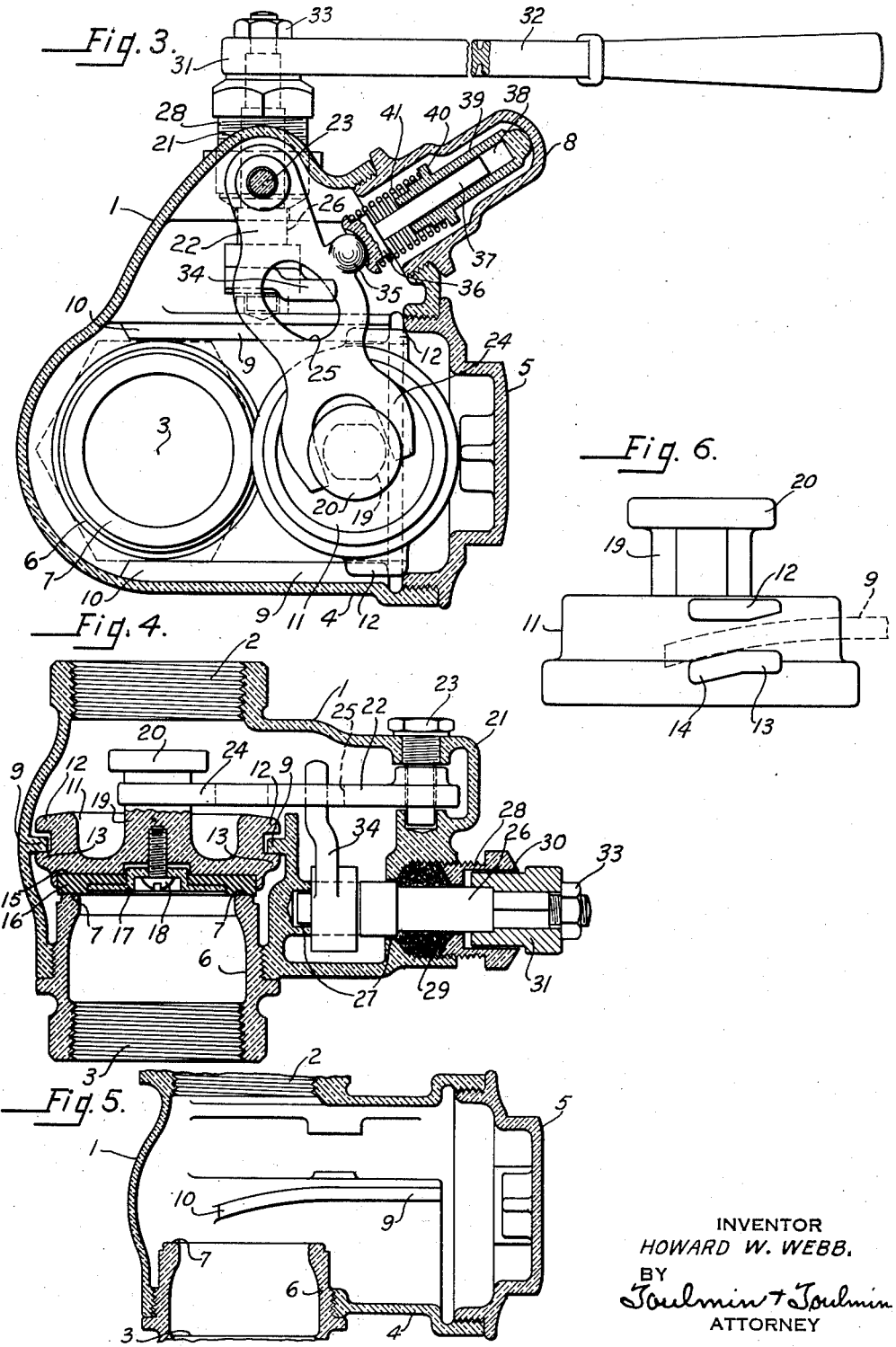
INVENTOR
HOWARD W. WEBB.
BY
Toulmin & Toulmin
ATTORNEY Patented July 31, 1934

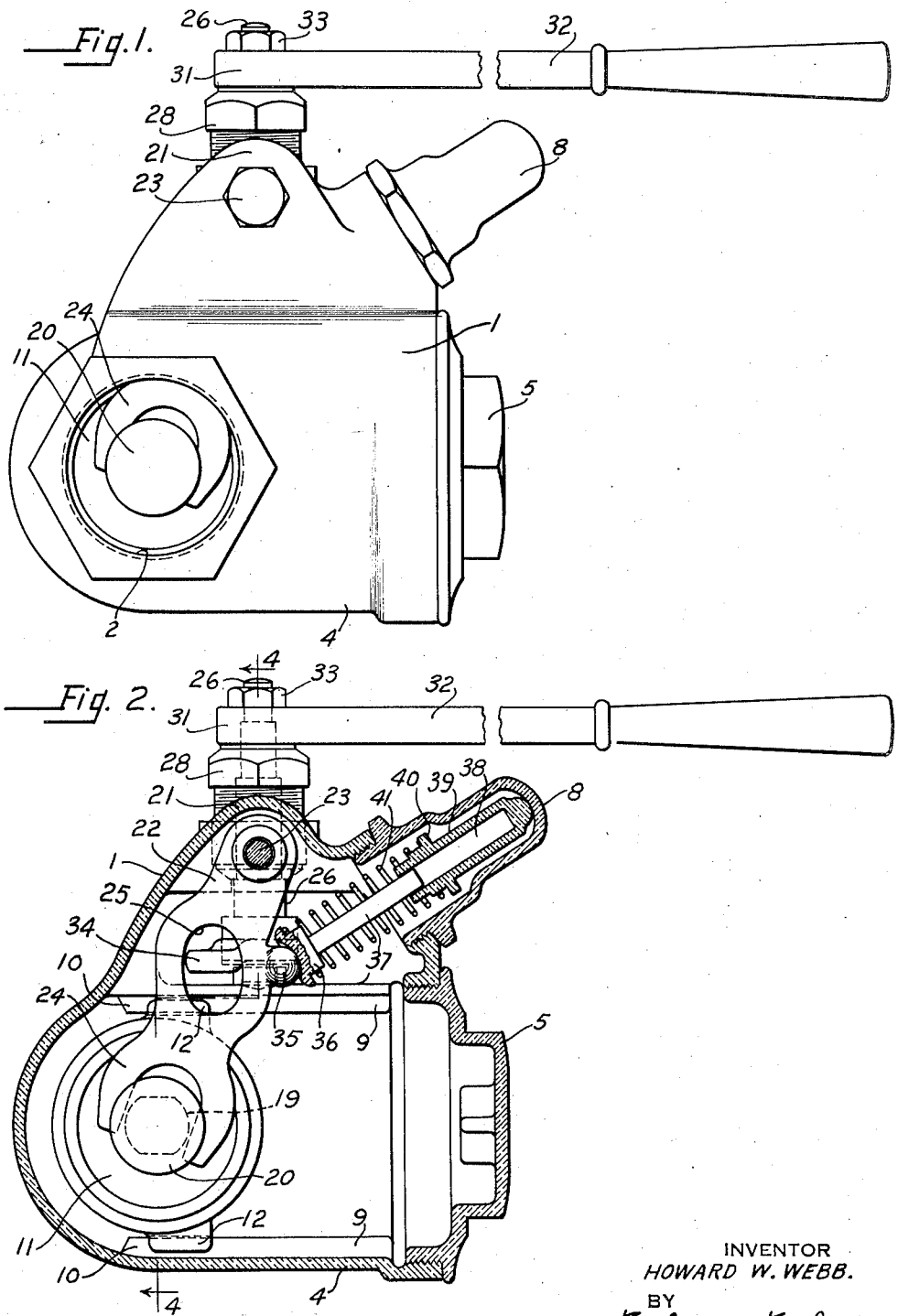

1,968,666

UNITED STATES PATENT OFFICE 1,968,666

SWINGING GATE VALVE

Howard W. Webb, Dayton, Ohio, assignor to Buckeye Iron and Brass Works, Dayton, Ohio, a corporation of Ohio Application July 30, 1932, Serial No. 626,354

1 Claim. (Cl. 251—56)

This invention relates to improvements in valves, and particularly that type of valve known as a swinging gate valve.

It has for its object to provide, in connection with a gate valve, means for moving the valve out of the line of flow of the fluid through the valve casing, and means for cooperating with the valve as it moves to and from its seat to cause the valve to closely engage the seat upon being seated, or to be removed from the seat when the valve is operated for opening purposes. By this means the valve may seat without a sliding contact with its seat and yet be moved across the face thereof but slightly removed therefrom.

It is also an object of this invention to provide, in connection with a valve casing, a gate valve therein with guides for seating the valve, and so seating the valve that it is held in seating engagement by the pressure of the liquid in the valve casing.

These and other advantages will appear from the following description taken in connection with the drawings.

Referring to the drawings:

Figure 1 is a top plan view of the valve casing inclosing the valve structure of the present invention.

Figure 2 is a horizontal section through the casing, showing the valve seated and the mechanism for operating the valve in the position it assumes when the valve is seated.

Figure 3 is a section similar to Figure 2 but with the valve in open position so that no obstruction is offered to the flow of liquid through the passageway in the valve casing.

Figure 4 is a section on the line 4—4 of Figure 2 through the casing, showing the mechanism located therein, the valve and its guides and the seat engaged by the valve.

Figure 5 is a sectional view of the casing showing one of the curved guides for the valve and the relation of the guide to the valve seat.

Figure 6 is a side elevation of the valve showing the guide lugs for engaging the valve guides on the casing.

The valve casing 1 may be placed in such a position that the passageway is vertical, with the inlet toward the top of the casing, or it may be so positioned that the passageway is on a horizontal line. This passageway is clearly shown in Figure 4, and has an inlet 2 and an outlet 3.

Extending from one side of the casing and at right angles to the passageway is a circular extension 4, which is closed by means of a threaded cap 5. This extension affords a passageway by which the valve may be inserted into the casing. Threaded into the outlet part of the passageway is a seat member 6, which has on its inner end an annular seat 7 adapted to be engaged by a gasket located on one side of the valve.

On opposite sides of the passageway, about midway between the inlet and the outlet, are ribs or fins 9, which serve as guides for the valve. These fins adjacent the outer end of the extension 4 are substantially straight but curve toward the seat 7 as they approach the opposite side of the casing from the extension 4. These curved parts of the ribs are indicated by the numeral 10, and serve to properly seat the valve against the seat 7 without frictional contact therewith, due to the movement of the valve to and from the seat. Adjacent the extension is a second opening in the casing, which has threaded therein a cap 8. This cap is much deeper than the cap 5 and serves to inclose and seat a mechanism for forcing the valve into seated position.

The valve 11, which is in the nature of a gate valve, has on opposite edges a pair of lugs. One lug of each pair is indicated by the numeral 12 while the other is indicated by the numeral 13. These lugs are so shaped that they provide a passageway between them in which one of the ribs 9 fits. The opposite ends of the lugs of each pair diverge.

One face 14 of these diverging lugs is located on the lug 13. This face engages the side of the rib adjacent the seat member so that when the valve is seated this face will closely engage the curved part of the rib. The slant of this face is at an angle to the axis of the valve equal to the angle each curved rib makes with the axis of the passageway so that when the valve is seated and the surface 14 engages the curved part of the rib, the valve has its engaging surface in line with the seat 7.

In the face of the valve member, adjacent the seat member, is an annular cup 15, which has located therein a gasket 16 made of some suitable material. This gasket is held on the valve by means of a disc 17 and a screw 18 threaded through the disc into the valve member. By means of the gasket a close fit is possible between the valve and the seat member. On the opposite side of the valve member from the gasket is a hub 19, which has on its outer end a flange 20.

Adjacent the cap 8 there is provided on one side of the casing an enlargement 21, which has extending into it one end of a lever 22, which is pivotally supported at this end by means of a screw 23 extending through the walls of the enlargement and the end of the lever. The end of the lever opposite the screw or pivot has a yoke 24, which fits around the hub for operating the valve. Between the pivot and the yoke is a hole 25 in the lever adapted to receive some instrumentality for operating the lever.

Suitably located in some part of the casing is a shaft 26, supported by means of bearings 27, one located in the main part of the casing while the other is located in the extension. The part of the extension around the outer end of the shaft is enlarged and threaded to receive a packing gland 28 which forms with the wall of the extension a packing space in which packing 29 is located for preventing leaks.

This packing gland has in its outer end a socket 30, which receives a hub 31 on one end of a handle 32. In order to receive this hub the outer end of the shaft is square and fits into a similarly shaped hole in the hub so that the shaft, through the hub and the handle, may be rotated. The hub and handle are held in operating position on the shaft by means of a nut 33.

Between the two bearings the shaft has extending therefrom an arm 34, which projects into the hole 25 in the lever. By means of this arm the lever 22 is operated to seat and unseat the valve. This arm is operated through the shaft and the handle.

Located on one side of the lever 22, adjacent the hole 25, is a ball 35 which is engaged by a head 36. This head has a seat on one side for seating the ball, and has on the side opposite the seat a stem 37, which extends into a hole 38 in a thimble member 39 located within the cap 8. This thimble member has about it a shoulder 40, which serves as an abutment for one end of a spring 41, the other end of which spring abuts the head 36. This spring, engaged by the head and the shoulder, tends to force the lever in such a position that it will seat the valve. Whenever the valve is open it is opened against the force and operation of this spring.

It will be understood that it is desired to comprehend within this invention such modifications as come within the scope of the claim and the invention.

Having thus fully described the invention, what is claimed as new and desired to be secured by Letters Patent, is:

In a valve mechanism, a casing having a passageway therethrough and an extension forming an opening to the passageway, a seat around the passageway, a pair of ribs, one on each of opposite sides of the opening and the passageway, and a valve adapted to be inserted through the opening and having on each of opposite edges a pair of lugs guided by the ribs across the passageway, said ribs being curved at their inner ends to force the valve against the seat, the inner surface of each lug having parts in different planes to engage different parts of the rib.

HOWARD W. WEBB.